United States Patent [19]

Ladwig

[11] Patent Number: 5,662,218

[45] Date of Patent: Sep. 2, 1997

[54] REUSABLE COMPACT DISC PACKAGE

[75] Inventor: James A. Ladwig, Chicago, Ill.

[73] Assignee: AGI Incorporated, New York, N.Y.

[21] Appl. No.: 223,202

[22] Filed: Apr. 5, 1994

[51] Int. Cl.$^6$ .............................. B65D 85/30; B65D 85/57
[52] U.S. Cl. ..................... 206/313; 206/309; 206/308.1
[58] Field of Search ................................. 206/309, 313, 206/444, 387, 308.1, 387.1

[56] References Cited

U.S. PATENT DOCUMENTS

| | | | |
|---|---|---|---|
| 4,589,549 | 5/1986 | Hehn | 206/387 |
| 4,627,532 | 12/1986 | Clemens | 206/309 |
| 4,702,369 | 10/1987 | Philosophe | 206/312 |
| 4,714,157 | 12/1987 | Morrone | 206/309 |
| 4,750,611 | 6/1988 | Morrone | 206/45.13 |
| 4,838,422 | 6/1989 | Gregerson | 206/444 |
| 5,168,991 | 12/1992 | Whitehead et al. | 206/310 |
| 5,253,751 | 10/1993 | Wipper | 206/45.19 |
| 5,263,580 | 11/1993 | Ciba et al. | 206/309 |
| 5,341,924 | 8/1994 | Morrone | 206/232 |
| 5,363,956 | 11/1994 | Taniyama | 206/312 |

*Primary Examiner*—Paul T. Sewell
*Assistant Examiner*—Tara L. Laster
*Attorney, Agent, or Firm*—Weil Gotshal & Manges

[57] ABSTRACT

A reusable compact disc package with a narrow three-sided spine compartment for holding a spine card identifying the compact disc title and a second compartment, essentially square, for firmly storing a sleeve containing a compact disc. The essentially square shape of the second compartment allows for the compact disc sleeve to be square and thereby contain a scaled down exact reproduction of the original album graphics of a previously released recording. The package contains a vertical opening opposite the spine such that the sleeve may be easily inserted into and removed from the package. The package also includes a retaining clip for firmly holding the sleeve in place inside the package. The package is comprised of two components with correlated lock tabs and receptacles such that the components may be cinched securely together to form a stable compact disc package which can be easily disassembled with the use of a two-pronged key. The spine card may be accessed only when the package is disassembled into its constituent components. Otherwise the spine card is firmly fixed in the package so that it is inaccessible.

3 Claims, 3 Drawing Sheets

REUSABLE COMPACT DISC PACKAGE

BACKGROUND AND SUMMARY OF THE INVENTION

In recent years, the "compact disc" or "CD", a 4.7 inch diameter metal record containing laser-readable information, has become the best selling consumer product in the field of recorded music. There is a concomitant need for an attractive, durable and reusable package in which to display, sell and store the compact disc.

Many compact disc packages have been created since the advent of the compact disc in the 1980s, including the so-called "jewel box" and the DIGIPAK® package. The latter was created by the assignee of the present invention and is the subject of U.S. Pat. No. 4,709,812. The jewel box package comprises three separate pieces of plastic, including clear front and back package panels and an opaque compact disc holder which snap-fits into the back package panel. The panels of the jewel box are normally hingedly connected along one edge so as to open like a book. Typically, one or two pre-printed inserts are included in the jewel box, one being held between the compact disc holder and the back panel so as to be displayed through the clear plastic of the panel, and the other being inserted between the clear plastic front panel and specially provided tabs projecting from the depending walls of the from panel, which tabs are generally parallel to the front panel and provide support to hold the preprinted insert against the inside of the panel. Additionally, the jewel box contains an insert in its spine identifying the rifle of the CD in the package.

A major drawback of the jewel box is that it does not allow the use of a recording artist's original album graphics in their original form, which are highly desired. This is because the area into which the printed inserts are placed is rectangular—not square—and therefore, the printed inserts themselves must also be rectangular. Thus, because original album graphics for classic recording artists such as the Rolling Stones are square, they cannot be used with the jewel box in their original form—their dimensions must be changed to accommodate the rectangular shape of the jewel box if they are to be used. The integrity of the original album graphics cannot be maintained. Original album graphics are often greatly desirable to music fans and of tremendous value to collectors. Thus, the ability to preserve the integrity of the original album graphics when selling a recording that was originally sold as an LP record in an album jacket is of great value. The present invention overcomes this problem by allowing original album graphics to be scaled down without modification and thereby used in their original form.

The DIGIPAK® package meets the same functional needs as the jewel box, although it is easier and more flexible to manufacture than the jewel box. It is constructed from a unitary blank, typically paperboard or other rigid material, which can be pre-printed on several surfaces prior to erection of the package. Because of this feature in which the package print and graphics are customized to the artist, record companies and consumers, particularly collectors, often prefer the DIGIPAK® package as opposed to the jewel box which is a generic package into which the printed portions must be inserted. The package also includes one or more compact disc holders, depending on the number of panels—4, 6, 8, 10 or 12. A disadvantage of the DIGIPAK® package is that it is pre-printed with the CD title and is therefore not capable of reuse with a different CD title.

Thus, as described above, while the jewel box and DIGIPAK® are suitable for long term storage of compact discs, they each have limitations that have not been resolved in the prior art. Likewise, there are still other compact disc packages available, each of which are incapable of reuse in the manner of the present invention and which otherwise fail to meet packaging needs addressed by the present invention.

The present invention provides a reusable CD package with a single elongated opening on one vertical edge in which at least one square sleeve (or jacket) containing a CD may be inserted and securely stored and a compartment along the opposite vertical edge, or spine, in which a narrow spine card may be placed to display the CD title on three sides—vertically along the spine and along small portions of the front and back of the package. The dimensions of the spine are such that the remaining display area of the package is essentially square, thus allowing a scaled down exact reproduction of the original album graphics for a previously released recording to be displayed on the CD sleeve.

The package is constructed of a front and rear component, the front component including lock tabs which snap securely into correlated receptacles in the rear component. The sleeve is typically pre-printed with text and graphics identifying the CD title in which case the package may be constructed of transparent plastic. Because shelf space is at a premium in retail outlets that sell compact discs, it is important to be able to maximize the number of disc units displayed on the shelf space. This is often done by printing the CD title vertically along the spine of the CD package so the package can be displayed on the shelf with only the narrow spine visible to the consumer. The present invention accomplishes this function with the elongated rectangular spine compartment for holding a replaceable spine card identifying the CD title. The spine compartment is fully enclosed such that the spine card may not be removed from the compartment when the package is in its assembled format. The package therefore also includes two small slots at the top and bottom into which a two-pronged key may be inserted and levered in order to unhinge and separate the package into its constituent parts thereby exposing the narrow spine compartment for easy removal and replacement of the spine card.

BRIEF DESCRIPTION OF THE DRAWINGS

FIG. 2a is a detailed view of the lock tab feature of the CD package;

PREFERRED EMBODIMENT OF THE INVENTION

Figure 1:
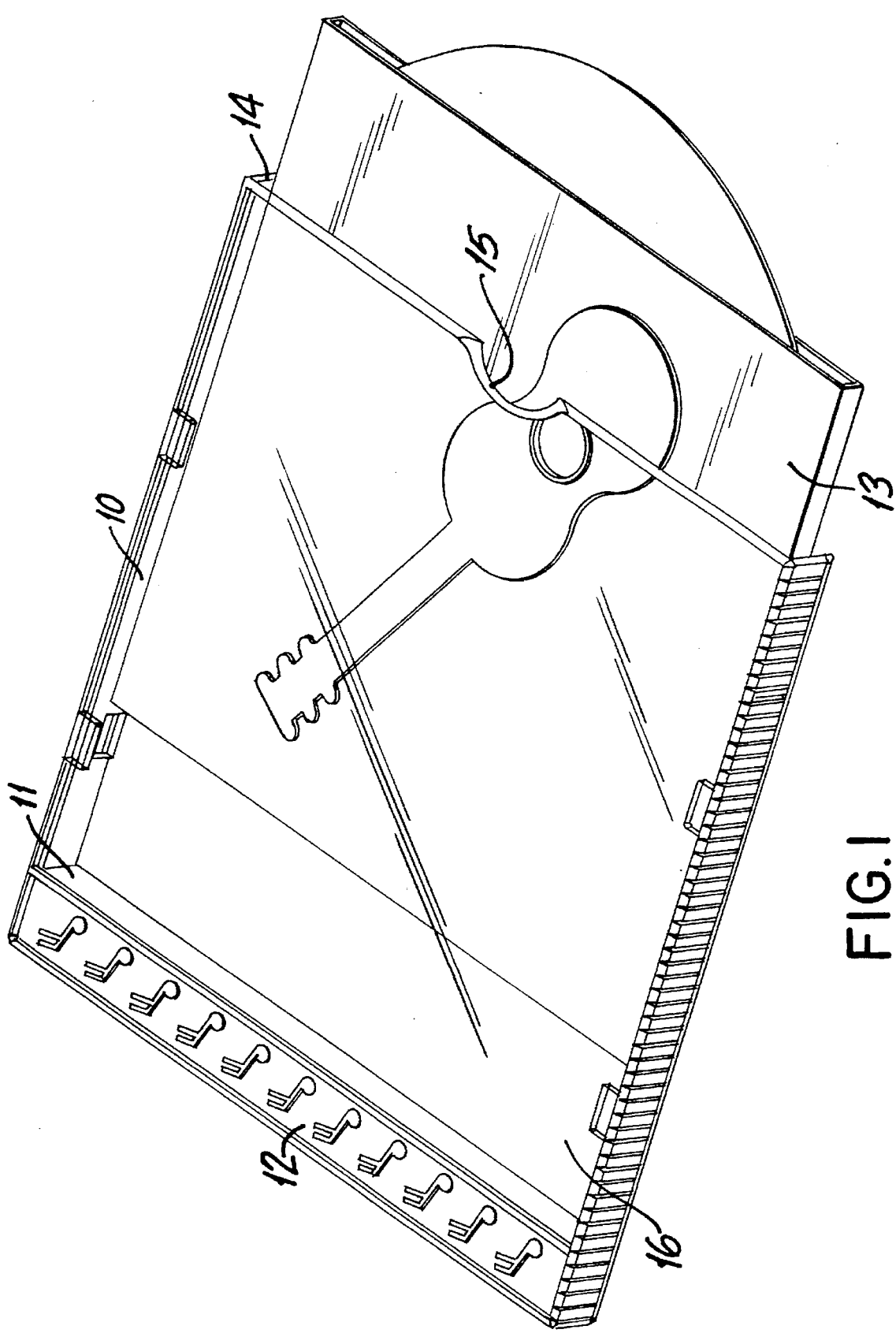
FIG. 1 shows a frontal view of the assembled CD package and sleeve.

Referring to FIG. 1, the invention in its assembled state comprises a rectangular package 10 constructed of transparent plastic with a three-sided spine compartment 11 into which a spine card 12 identifying the title of the compact disc may be enclosed. The package is large enough to snugly house a substantially square sleeve 13 containing a compact disc, which may be easily slid into an elongated vertical opening 14 along the side of the package opposite the spine compartment. The opening contains a curved notch 15 so the sleeve may be easily grasped and pulled from the package with the thumb and forefinger. The compartment for housing the sleeve 16 is substantially square. The package also includes a retaining clip (not visible in FIG. 1) which firmly latches the sleeve 13 in place when it is inserted into the package for storage.

Figure 2:
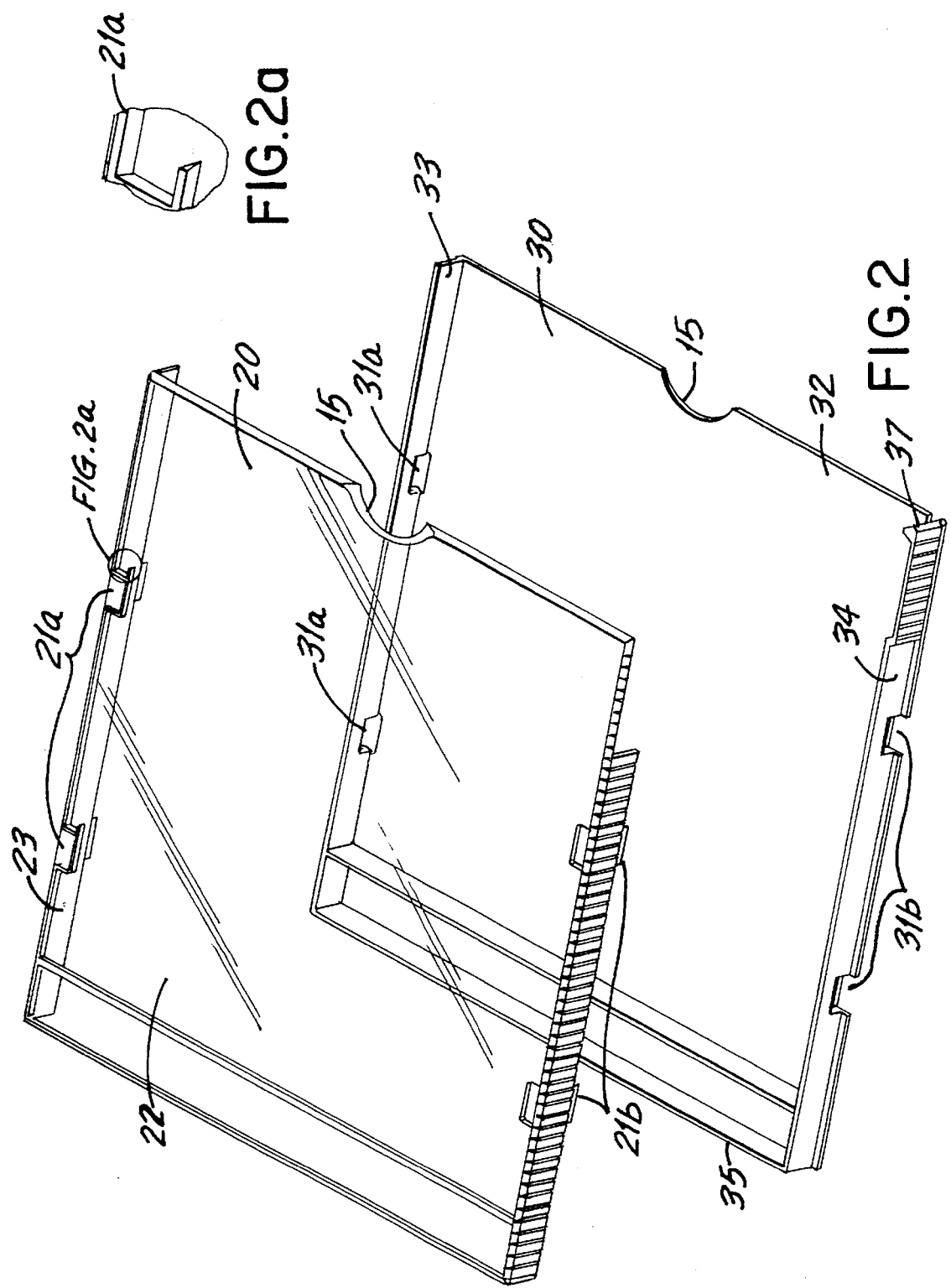
FIG. 2 is a detailed view of the front and rear components of the disassembled CD package.

Referring to FIG. 2, the package is assembled from front and rear components 20 and 30 which are fastened firmly together by four lock tabs in the front component, two each on the top 21a and bottom 21b, which snap snugly into four similarly placed rectangular receptacles in the rear component, two each in the top 31a and bottom 31b. A custom made "key" (see FIG. 3 below) may be inserted into two of the receptacles 31a or 31b in the rear component and levered away from the package to disassemble the package. The package may be disassembled without use of the key only by fracturing one or both of the front and back components.

Referring to FIG. 2, the front component 20 consists of a flat, rectangular section 22 with two perpendicular side walls 23 and 24 located at the top 23 and bottom 24 edges thereof and each extending its full width. These side walls, which are of height equal to the thickness of the package, comprise the outer edges of the assembled package and are therefore textured to improve the grip on the package. The side walls each contain two lock tabs 21a and 21b angling away from the side wall which latch into similarly placed receptacles in the rear component 30 to form the assembled package 10.

Referring to FIG. 2, the rear component 30 also consists of a flat, rectangular section 32 with side walls located at the top 33 and bottom 34 also extending the width of the package. Unlike the front component 20, however, the side walls 33 and 34 of the rear component are inset slightly from the outer edges of the flat rectangular section 32 sufficient to allow the front component to slide firmly over the rear component and latch securely together via the lock tabs and associated receptacles. The rear component also includes a third side wall 35 and interior wall 36 located at a ninety degree angle with the top and bottom side walls and which are parallel to each other and extend the length of the package along the side of the package opposite the opening to form a ½ inch wide spine compartment for holding a spine card 12 identifying the title of the compact disc and related information. Two top receptacles 31a and two bottom receptacles 31b are located along the edge of each of the top and bottom side walls 33 and 34 in alignment with the lock tabs 21a and 21b in the front component 20 such that the front and rear components may be latched firmly together to form the assembled package. The receptacles 31a and 31b extend around to the flat surface 32 of the rear component to provide an area sufficient to insert the two-pronged key 40 shown in FIG. 3. The rear component also contains a retaining clip 37 near the open edge which firmly cinches the sleeve 13 into the package for storage. In addition to the spine compartment, the second compartment for storing the compact disc sleeve that is formed when the front and rear components are latched together in the assembled package is substantially square.

Figure 3:
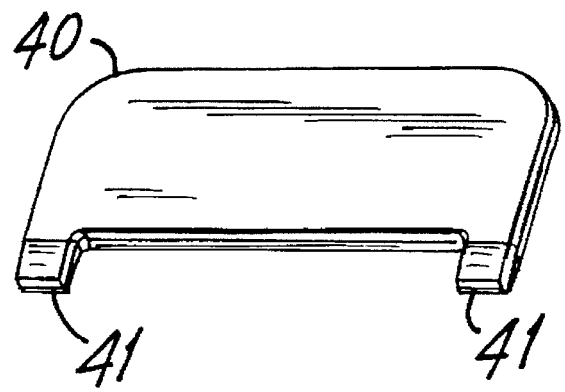
FIG. 3 shows the key.
Figure 3A:
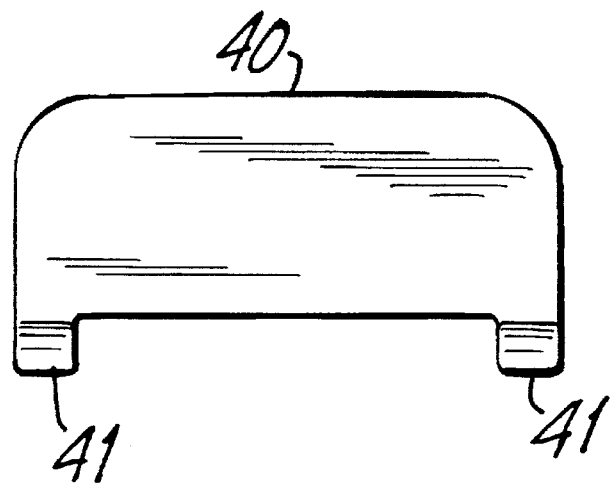
FIG. 3a shows the dimensions of the preferred embodiment of the key.
Figure 3B:
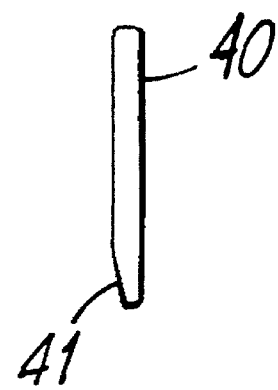
FIG. 3b shows the key viewed endwise.

Referring to FIG. 3, a two-pronged key 40 with prongs 41 separated by a distance equal to the distance between the receptacles 31a and 31b and slightly smaller in size than the receptacles is used to disassemble the package, for example, if the CD it contains is to be replaced by a different title. This operation is performed by inserting the prongs 41 into the receptacles (either top or bottom) and levering outward away from the package. This causes the lock tabs 21a and 21b to disengage from the receptacles so that the front and rear components detach. Without use of the key, the package cannot be disassembled without fracturing one or both of the components. Upon detachment, the spine card 13 can be easily removed and replaced with a spine card for a different CD title. Likewise, a new CD sleeve 13 for the new title may be used to match the spine card.

We claim:

1. A package for a compact disc, comprising:

a front component having a rectangular flat surface with top and bottom perpendicularly attached segments on opposite sides of the flat surface, the top and bottom segments extending the width of the flat surface;

the top and bottom segments having lock tabs which protrude outwardly from the segments and inwardly toward the flat surface;

a rear component comprising a rectangular flat surface with dimensions similar to the front rectangular component, top and bottom side walls slightly inset from the exterior of the flat surface with small receptacles coinciding with the lock tabs on the front component such that the front component fits securely to the rear component to form the assembled package, and a spine compartment formed by parallel third and fourth segments perpendicularly attached along a spine side of the flat surface;

a curved notch on an opening side of the front and rear rectangular component;

a retaining clip on the bottom segment for holding a compact disc sleeve firmly in place within the compact disc package; and an essentially square display area for displaying the compact disc sleeve.

2. A package for compact disks as in claim 1 further comprising a two-pronged key for disassembling the package.

3. A package for a compact disc, comprising:

a front component having a rectangular flat surface with top and bottom perpendicularly attached segments on opposite sides of the flat surface, the top and bottom segments extending the width of the flat surface;

the top and bottom segments having lock tabs which protrude outwardly from the segments and inwardly toward the flat surface;

a curved notch on an opening side of the front and rear rectangular component;

a rear component comprising a rectangular flat surface with dimensions similar to the front rectangular component, top and bottom side walls slightly inset from the exterior of the flat surface with small receptacles coinciding with the lock tabs on the front component such that the front component fits securely to the rear component to form the assembled package, and a spine compartment formed by parallel third and fourth segments perpendicularly attached along a spine side of the flat surface; and an essentially square display area for displaying the compact disc sleeve.

* * * * *